Oct. 11, 1960  E. V. BERGSTROM  2,956,011
METHOD AND APPARATUS FOR THE SUPPLY OF HYDROCARBON
CHARGE TO A CONVERSION REACTOR
Filed Nov. 5, 1959  8 Sheets-Sheet 6

INVENTOR
Eric V. Bergstrom
BY
Andrew L. Gabriault
ATTORNEY

United States Patent Office 2,956,011
Patented Oct. 11, 1960

2,956,011

METHOD AND APPARATUS FOR THE SUPPLY OF HYDROCARBON CHARGE TO A CONVERSION REACTOR

Eric V. Bergstrom, Byram, Conn., assignor to Socony Mobil Oil Company, Inc., a corporation of New York Filed Nov. 5, 1959, Ser. No. 851,148

11 Claims. (Cl. 208—166)

This application is a continuation-in-part of copending application Serial Number 719,645, filed March 6, 1958, now abandoned, which was a continuation-in-part of application Serial Number 535,705, filed September 21, 1955, now abandoned, and which in turn was a continuation-in-part of application Serial Number 311,286, filed September 24, 1952, now abandoned.

The invention detailed herein deals with a method and apparatus for the conversion of fluid hydrocarbons in the presence of a moving granular contact material mass. Specifically, this invention is concerned with the method and apparatus for the introduction of hydrocarbon charge to the conversion zone of such processes.

Typical of the processes to which this invention may be applied is the well-known Thermofor catalytic cracking process, wherein a granular solid catalyst is continuously cycled in compacted condition between a reaction zone and a regeneration zone. In the reaction zone the catalyst is contacted by a fluid hydrocarbon charge, which charge is converted to lower boiling, gasoline-containing hydrocarbons through the medium of the catalytic solid. As a result of this conversion carbonaceous material is deposited on the catalyst. This material, commonly referred to as coke, is removed by burning in the regeneration zone.

Other processes to which this invention might be applied include catalytic dehydrogenation, polymerization, isomerization, alkylation, hydrocracking and the like. The invention is also applicable to processes in which the granular solid does not exhibit catalytic properties, such as thermal coking, cracking, visbreaking, and the like, in the presence of a granular inert material.

In such processes where the solids are catalytic in nature, they may be natural or treated clays, bauxite, activated alumina or synthetic associations of silica, alumina or magnesia, or combinations thereof, to which various metals or metallic oxides or sulfides may be added in small amounts for various specific purposes. Inert contact material may be in the form of refractory materials, such as zirkite, corhart or mullite, or it may be particles of quartz, fused alumina or coke or stones, metallic particles or balls.

In general, the contact material should be of palpable particulate form as distinguished from finely divided powders, and it may have the physical shape of pellets, tablets, spheres, and the like, or it may be irregular in shape such as might be obtained from conventional grinding and screening operations. Generally, the contact material should be within the size range about 1 inch to 100 mesh, and preferably 4 to 20 mesh by Tyler standard screen analysis. The term "granular," as used herein in describing and claiming this invention, should be understood to include any contact material of the above described form and size, whether of regular or irregular shape.

Some of the most pressing problems in the technology surrounding conversion systems of the foregoing types are involved with the supply of a hydrocarbon material which cannot be satisfactorily vaporized at the temperature and pressure which it is desired to maintain in the conversion zone because it undergoes a thermal decomposition before the desired conversion temperature is reached. This makes it a requirement of such systems, in order to handle such charge stocks, that such materials be supplied as liquids to the conversion zone and that they be introduced at temperatures substantially below the desired conversion temperature. There has been a wide variety of systems proposed for supplying this liquid component. Recently systems which inject the liquid component, frequently admixed with the vapor part of the charge, into a compact stream of contact material have found considerable favor and have been shown to be, in general, superior to the older schemes that were based on spraying the liquid component into a falling contact material curtain, in ability to distribute liquid on the contact material and in avoiding coke formation on the reactor walls.

In all of the prior art systems, since both the liquid and vapor parts of the charge are normally supplied well below the conversion temperature, the contact material must enter the conversion zone at a temperature level substantially above the conversion temperature. The temperature difference between hydrocarbon charge and contact material charge is typically several hundred degrees. All of the commercially feasible charge systems have been based upon supplying the liquid to only a portion of the hot contact material. Complete, uniform contacting of the entire hydrocarbon charge with the entire contact material charge has never been achieved. This has led to one serious deficiency in all of these systems, the creation of temperature differentials across the reaction bed. The contact material which escapes subjection to any portion of the charge passes to the reaction bed at about the same temperature at which it entered. Contact material which may be subjected to an amount of charge far in excess of its fair share of the conversion load will pass to the reaction bed at a temperature about equal to that at which the charge was supplied. Other contact material will pass to the bed at intermediate temperatures, depending on the degree to which it has been initially contacted with the cooler charge. The temperature differentials so set up mean, of course, that various parts of the bed are at temperatures widely removed from the ideal optimum conversion temperature for which the process was designed. Thus, parts of the charge which pass over the contact material above the optimum temperature will be overreacted, while those parts passing through the lower temperature contact material will be underreacted. The over-all effect of this phenomenon is to decrease the value of the product which is obtained over the product which would be obtained if the entire charge were contacted at the optimum conversion temperature. This may cause a loss in the product revenue from any given unit amounting to as high as $1,000.00 a day.

A similar situation exists where the charge is supplied substantially above the conversion temperature and the contact material below. The temperature gradients here will have their peaks below the hydrocarbon charge points and their minimums in the regions which contact no charge initially. The loss in revenue will occur in similar manner, however.

The major object of this invention is to provide a method and apparatus for supplying liquid or mixed phase hydrocarbon charge and contact material existing at different temperatures to the conversion zone of processes employing the granular contact material as a moving mass which overcomes the above-described difficulties.

Another object of this invention is to provide a method and apparatus for supplying the mixed phase hydrocarbon charge and contact material to the reaction zone of moving mass type conversion systems and which minimizes temperature differentials across the reaction bed due to only a portion of the contact material being initially subjected to the hydrocarbon charge.

Another object of this invention is to provide a method and apparatus for supplying a mixed phase hydrocarbon charge and granular material to a compact mass of granular material, in which a major portion of the charge contacts a major portion of the incoming granular material and excessive temperature differentials across the mass are avoided.

Broadly, this invention achieves these objects by maintaining, above a downwardly moving, substantially compact reaction bed of contact material, a confined mass of contact material in compact condition. Fresh contact material is supplied to the upper section of this mass while contact material passes from the lower section of the mass onto the upper surface of the reaction bed. Hydrocarbon charge, which may be in either liquid, gaseous or mixed phase, is injected into the mass or the lower part of the stream feeding it. This injection may be accomplished by any one of a variety of known methods, or it may be by a process which is part of this invention. The hydrocarbon feed exists, prior to injection, at a temperature substantially different from the temperature of the contact material into which it is passed. Gaseous material from the charge is disengaged from the mass and passed into the upper end of the reaction bed substantially separately from the contact material which flows from the mass to the bed.

In a preferred form of this invention the confined mass has at least a part of its upper surface unconfined and in open communication with a gas space thereabove. The hydrocarbon charge injection is into the mass beneath the unconfined surface at a rate sufficient to disrupt the mass immediately above the injection point. Through the disrupted region all gaseous material injected as a part of the charge and all gaseous material formed in the disrupted region from liquid charge is disengaged from the mass and passes into the gas space. From the gas space the vapors flow around the mass and into the upper section of the reaction bed.

The mechanism by which the aforementioned disengaging-re-engaging step acts to minimize temperature differentials across the reaction bed is readily understood. Assuming a system in which the hydrocarbon charge is below the introduction temperature of the contact material, gaseous material or vapor from the charge, after disengaging from the mass and before passing into the reaction bed, will be at one single uniform temperature which must be below the temperature of that portion of the contact material which was not subjected to any hydrocarbon charge. The contact material which did act to vaporize and react the charge will be at substantially lower temperature, but if the disengaging action is rapid enough, it may still be substantially above the temperature of the hydrocarbon charge entering the reaction bed. Regardless of this, however, the latter contact material will be at a temperature substantially below that of contact material which remained unsubjected to the charge. When the vapor then passes into the reaction bed and through its upper portion, there will be heat exchange between regions carrying contact material at widely different temperatures. This heat exchange will, of course, be most pronounced with the hottest contact material, that contact material undergoing the largest drop in temperature. Progressively lower reductions in temperature will be encountered as the contact material temperature gets closer and closer to that of the vapor. Thus, by this heat exchange, the temperature differentials set up across the bed, due to the hydrocarbon charge contacting only a part of the contact material charge, will be reduced in magnitude. The greater the reduction, the more money that is saved over conventional operations.

Without the disengaging from the mass and re-engaging in the reaction bed, the vapors formed after the initial charge injection would have to distribute themselves across the reaction bed by flowing laterally through the bed. As vapor moved laterally, it would be subjected constantly to the action of hot catalyst which had not been initially reduced in temperature by the hydrocarbon charge contact. By the time vapor reached regions of the bed most remote from the charge points, it would have already been elevated in temperature to that of the incoming hot contact material. In the prior art these points of high temperature were so far apart that the temperature differential set up persisted throughout the bed, the vapor not acting to minimize it. With the method of this invention, however, the lateral distribution of vapor from the charge points occurs out of contact with contact material. Consequently, the portions of the reaction bed which received the hottest contact material from the points most remote from the charge injection points are not subjected to vapor which has previously been heated by passage through other hot contact material. Therefore, the vapor they contact is substantially cooler and it will act to bring the temperature of this hot contact material closer to the optimum for the particular conversion involved.

This invention will be best understood by referring to the attached drawings, of which:

Figure 5 is a diagrammatic elevational, sectional view of an alternate form of hydrocarbon charge injection apparatus which may be used in systems employing the general schemes shown in Figures 3 or 4;

Figure 6 is a diagrammatic sectional view along line 5—5 of Figure 4;

This invention will be explained with reference to a system in which the hydrocarbon charge is substantially cooler than the entering contact material. This should not be construed as limiting the invention to such a system, however, since it is equally applicable to the converse.

Figure 1:
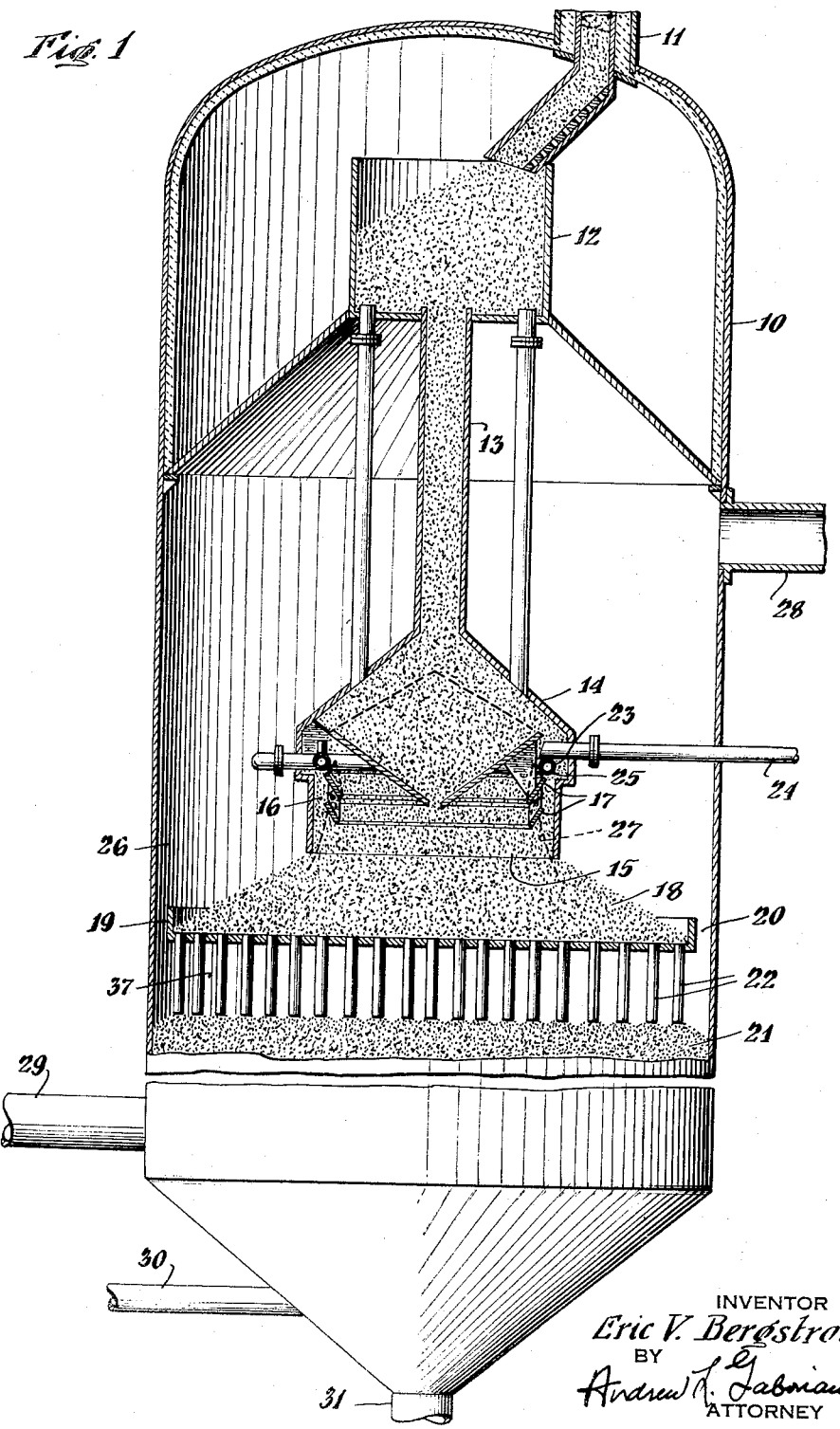
Figure 1 is a diagrammatic elevational view, partially in section, of a hydrocarbon conversion reactor employing one form of this invention.

In the apparatus shown in Figure 1, fresh hot contact material, at a temperature suitable to effect the desired conversion, for example, about 1030° F., is passed into the upper section of conversion reactor 10 through passageway 11. This contact material is discharged into a cylindrical, open-topped receptacle 12 situated within the upper section of reactor 10. Contact material gravitates from the lower section of receptacle 12 downwardly as a compact stream through passage 13 into a hood 14. The contact material passes outwardly beneath the hood and exists therein in compacted condition. Within hood 14 there is induced in the contact material feed streams therein a central low velocity region 15 and a peripheral high velocity region 16. The high velocity region carries a major portion of the contact material flow in the feed stream and preferably carries 90 percent of such flow. The various ways in which these two regions of flow may be formed are described and claimed in U.S. patent application Serial Number 633,623, filed January 11, 1957. Generally, it is accomplished through the use of baffles 17 and by taking advantage of the flow characteristics of granular material.

Contact material discharges from this feed stream onto an accumulation of contact material 18, which is maintained within a cylindrical, open-topped receptacle 19. Receptacle 19 has a cross-sectional area amounting to a major fraction of the cross-sectional area on reactor 10, but has lateral dimensions less than those of reactor 10, so that a space 20 is defined between the outside wall of receptacle 19 and the inside wall of reactor 10. Contact material gravitates from the underside of accumulation 18 downwardly onto the upper surface of a compact reaction bed 21 by means of pipes 22, the contact material existing in said pipes as a plurality of compact streams.

Hydrocarbon charge, previously fractionated into liquid and vapor components by outside means (not shown), is supplied to separate locations in reactor 10. The liquid portion of the charge is injected into the peripheral high velocity contact material region 16, in the manner described and claimed in U.S. patent application Serial Number 633,623, filed January 11, 1957. Liquid hydrocarbon charge is supplied to a ring manifold 23 by means of a passageway 24. The liquid passes into region 16 through a plurality of spaced-apart orifices 25 in the underside of ring 23. The liquid charge might typically be supplied at about 780° F. On contacting the hot contact material, most of the liquid is either vaporized or cracked, and it passes downwardly around the lower edges of hood 14 to be disengaged from the open upper surface of accumulation 18 into contact material-free space 26 thereabove. These vapors then pass downwardly through space 20 and distribute themselves beneath receptacle 19 in space 37 before passing into the upper end of reaction bed 21 in the area between passages 22. The boundary of the peripheral region 16, in which initial contact between contact material charge has been made, is defined by line 27. Contact material from central region 15 is substantially untouched by hydrocarbon charge and therefore remains at a temperature close to the high temperature at which it was initially supplied to the reactor. This contact material gravitates through the centermost of pipes 22 to form what would be a hot core of contact material through the center of the reaction bed 21.

The vapor components of the charge is supplied through passageway 28 and joins the vapors formed from the liquid component in passing around receptacle 19 through space 20 and into the upper end of reaction bed 21 through the area between passages 22. These two vapor fractions might, in a typical case, have an average temperature of about 843° F. Catalyst exiting from pipes 22 to supply the hot regions of bed 21 might be at 1030° F., while catalyst supplying cooler regions would be at 975° F. Passing the cool vapor at the above temperature through these two regions would bring the hot regions down to 950° F. average and the cooler ones to 920° F. average. Thus, the over-all effect would be toward the equalization of temperatures across bed 21. Pipes 22 are preferably spaced apart less than 20 inches center-to-center, as described and claimed in U.S. Patent 2,846,370 to Halik et al., in order to avoid setting up additional temperature differentials due to cross-flow of contact material and vapor at the reaction bed surface.

The products of conversion are removed from the reactor through passage 29 extending from the lower section thereof. The downwardly moving contact material is then purged free of hydrocarbon material by means of inert purge gas, such as steam or flue gas, admitted through passage 30. The used contact material is removed through passage 31 and passed to a conventional regeneration system (not shown) to be reconditioned, after which it is returned to the upper end to reactor 10 through conduit 11 for re-use within the reactor.

Figure 2:
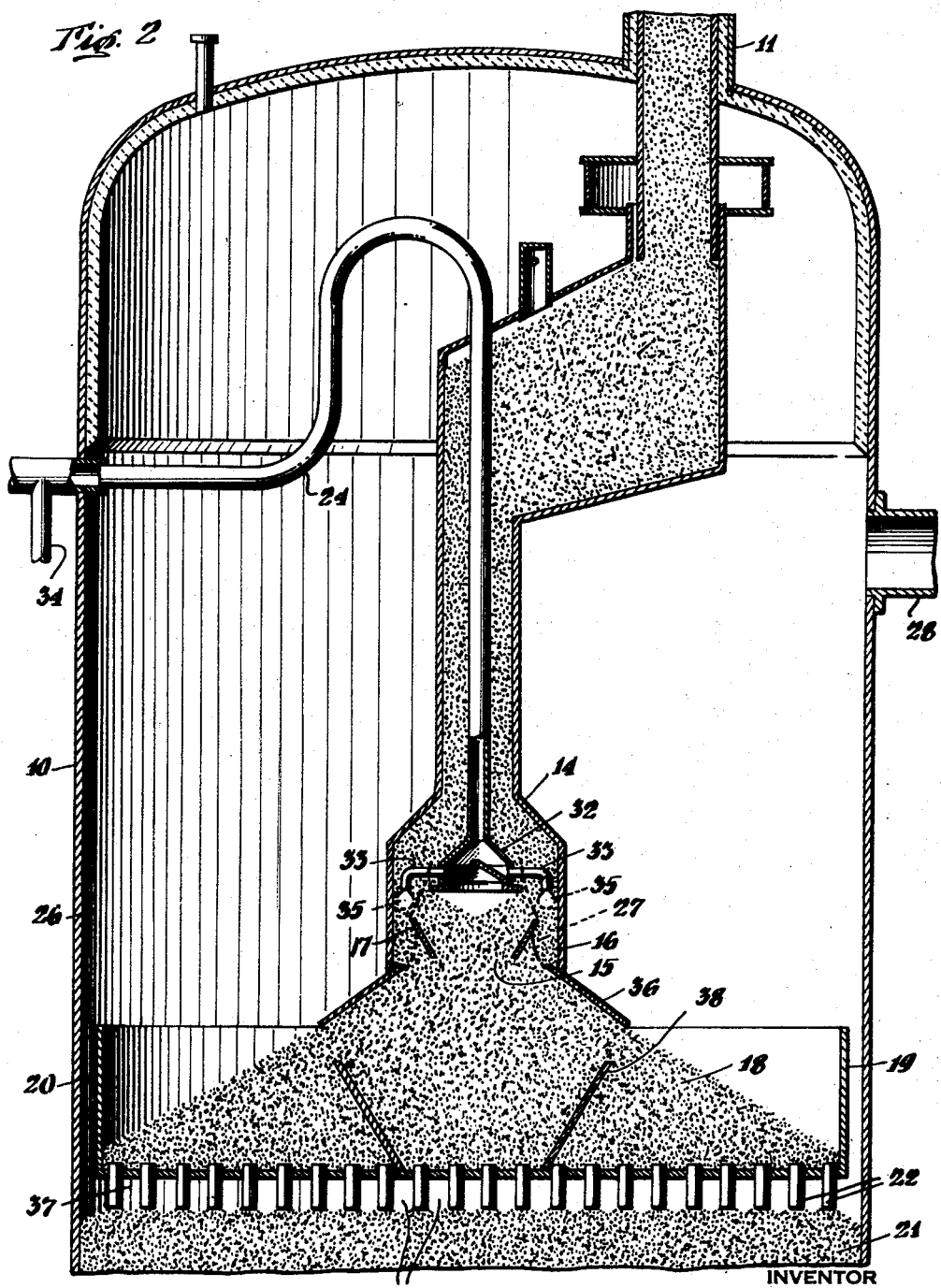
Figure 2 is a diagrammatic elevational view, partially in section, of the upper section of a hydrocarbon conversion reactor employing a modified form of this invention.

Figure 2 illustrates an apparatus very similar to that of Figure 1. This apparatus is adapted to operate in a different manner from that of Figure 1, still, however, within the broad scope of this invention. In the device of Figure 2 there is maintained a central manifold 32 within hood 14. From this manifold there extends a plurality of radial pipes 33 which have downwardly facing outlet ends adjacent the walls of hood 14 and within the high velocity region 16 of contact material flow within hood 14. Liquid passes to manifold 32 through passage 24. Steam is added to the liquid flowing within passage 24 through passage 34 prior to the liquid supply to manifold 32. The amount of steam added is sufficient to cause a bubble 35 to be formed at the outlet end of each of passages 33. In order that this may occur, the velocity of material issuing from each of passages 33 must exceed the boiling mass velocity of the contact material.

The term "boiling mass velocity," as used herein, denotes the mass velocity (unit weight per unit area per unit time) of the charge which causes a pressure gradient (unit pressure per unit length) in the immediate vicinity of the injection point equal to the apparent density of the material in the compacted condition into which the charge is injected. "Apparent density" is the density determined by weighing a volume of contact material packed to the degree it is packed at the point of charge injection.

Of course, within the broader scope of this invention the gas supplied at 34 need not be steam but may be any other gaseous material, for example, a part or all of the vapor portion of the charge.

Within and adjacent to each of bubbles 35 contact material and liquid are intimately mixed. Vapors expand into the region of lower contact material velocity 15 and pass downwardly into accumulation 18. In the apparatus of Figure 2, the portion of the upper surface of accumulation 18, adjacent the lower end of hood 14, is confined by a conical member 36 which has sides at angles with the horizontal greater than the angle of repose of the contact material. Hood 36 extends outwardly a sufficient distance that the vapors which pass around the edges of member 36 into vapor space 26 thereabove are at a velocity less than the boiling velocity of the contact material. By this means disruption of the surface of accumulation 18 is avoided. The vapor portion of the charge, if it has not been supplied with the liquid, is admitted to vapor space 26 through passage 28 and passes downwardly to be joined by vapors formed within hood 14 and accumulation 18 which disengage from the open portion of the upper surface of accumulation 18. These vapors, all existing at temperature substantially below the contact material temperature, then pass around receptacle 19 through space 20 and distribute themselves uniformly across the space 37 beneath receptacle 19 but above reaction bed 21. They then pass into the upper end of bed 21, and by reason of the temperature differential between them and various parts of the contact material bed 21, temperature differentials across the bed are minimized in the manner described above.

In addition to assisting in the formation of bubbles 35, the steam added has the effect of decreasing the tendency of the liquid to overcrack within hood 14 because of the high catalyst to oil ratio there.

In order to keep the central hot core of contact material to a minimum, the device of Figure 2 employs a central inverted frusto-conical baffle 38 that is designed to catch all of the contact material which passes through region 15 within hood 14, and which contacts no liquid and only a minimum amount of vapor. The lower end of baffle 38 has an opening amounting to only a small fraction of the reactor cross-section, for example, about 5 percent. The amount of contact material which passes through region 15 in hood 14 is controlled by the amount which will flow through baffle 38. Thus, the opening in the lower end of 38 controls the flow through region 15, and controls the fraction of the reaction bed which will be supplied from region 15.

Figure 3:
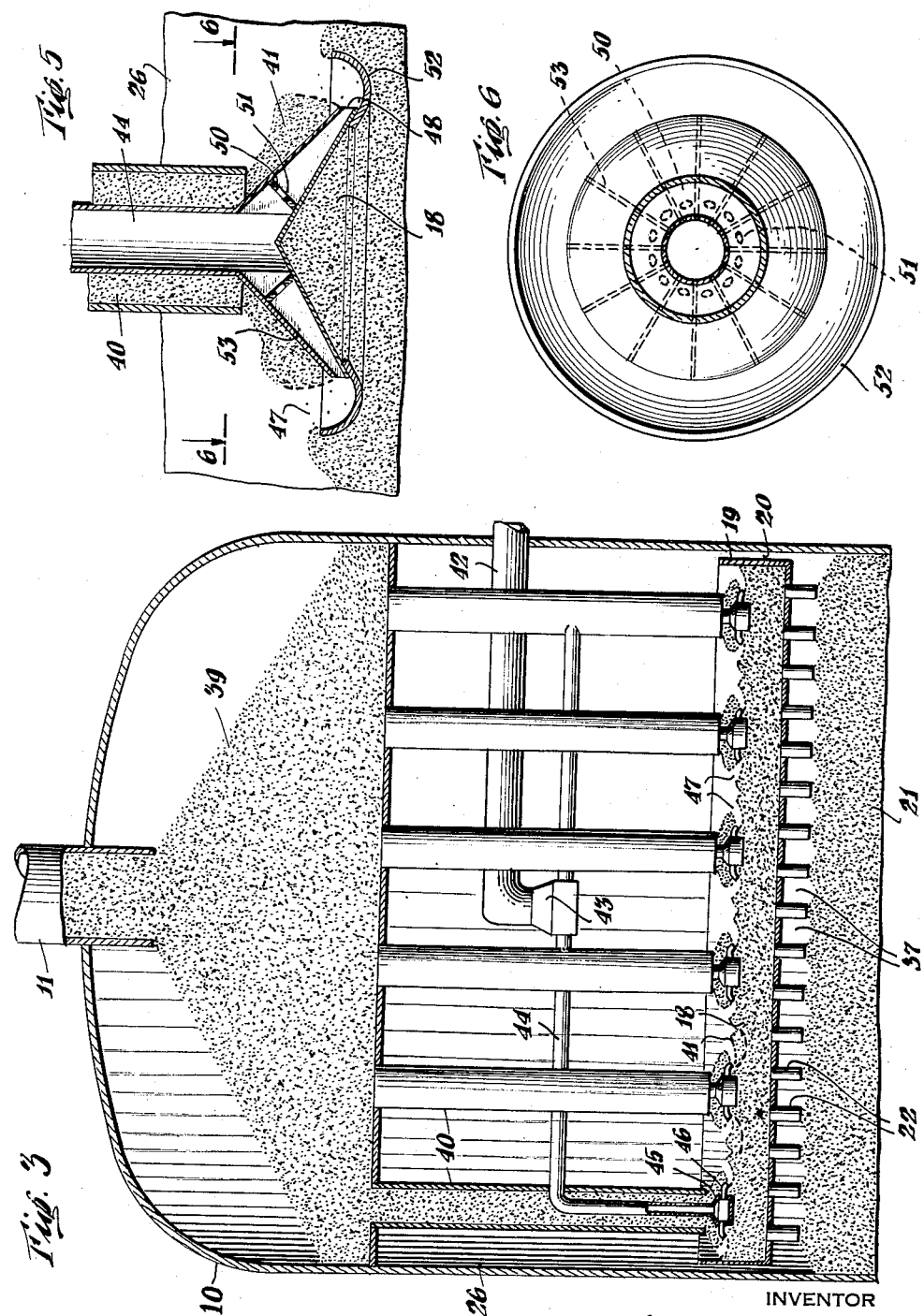
Figure 3 is a diagrammatic elevational view, partially in section, of the upper section of a hydrocarbon conversion reactor employing a preferred form of this invention.

A further modified form of this invention, suitable to utilize a single feed stream of mixed liquid and vapor, is illustrated in Figure 3. A contact material feed bed 39 is maintained within the upper section of reactor 10 and is supplied with fresh hot contact material through passage 11. A plurality of substantially compact streams of contact material 40 pass downwardly from feed bed 39 onto the surface of compact contact material accumulation 18, which is of horizontal cross-section amounting to a major fraction of the cross-section of reactor 10, but which is less than the cross-section of reactor 10 so that a space 20 is defined between the receptacle 19 which holds accumulation 18 and the walls of the reactor. The effluent from streams 40 forms a plurality of frusto-conical surfaces on accumulation 18, having sides making angles with the horizontal equal to the angle of repose of the contact material. A plurality of streams 22 pass from the underside of accumulation 18 onto the downwardly gravitating reaction bed 21, and these streams define space 37 between the underside of receptacle 19 and the upper end of reaction bed 21. Each of streams 40 expands outwardly across the portion of accumulation 18 which it serves, so that there is formed across accumulation 18 a plurality of frusto-conical layers of contact material 41 which are moving transversely to supply those parts of accumulation 18 not lying directly beneath one of the passages confining streams 40. These layers 41 contain a major portion of the contact material flow to accumulation 18 and within the moving system.

The mixed phase hydrocarbon charge enters the reactor through a single passage 42, from which it is supplied to a centrally situated manifold 43. A plurality of pipes 44 extend out of manifold 43. One of pipes 44 passes into each of streams 40 and is directed downwardly along the center line of such stream. Beneath each of the passages confining streams 40 there is situated a manifold 45, from which there extends a plurality of radial pipes 46 that terminate either below or within the high velocity layer 41 formed from the stream 40 which is immediately above the particular manifold 45 from which the one of pipes 46 in question extends. It is to be noted that the upper surface of accumulation 18 has the shape of a plurality of side-by-side frusto-conical planes with sides making angles equal to the angle of repose of the contact material and upper ends coinciding with the lower ends of conduits 40. The angle of repose will usually be within the range 25–45 degrees with the horizontal and usually is about 30 degrees with the horizontal.

The hydrocarbon charge issues from each of pipes 46 and disrupts the surface of accumulation 18 immediately adjacent its outlet, so that there is formed above each of pipes 46 a region through which vapor flows very rapidly to pick up contact material particles from accumulation 18, and particularly from layer 41, and blows them upwardly onto the surface of accumulation 18 as the vapor disengages from that surface. Each of these points might aptly be described as a miniature gas lift.

It is apparent that the contact time between vapor and contact material in this device is very short, so that the vapor passes into vapor or gas space 26 without any substantial temperature rise. The liquid part of the charge, however, will be screened out of the vapor by the contact material particles which flow up through the disrupted area 47. Some of this liquid will immediately vaporize and some will instantly crack to vapors but as long as any portion of the charge remains in liquid phase, it will be retained on the contact material in accumulation 18 and will pass to the upper surface of reaction bed 21 with that contact material. The cool vapors, however, pass from vapor space 26 around receptacle 19 through space 20 and distribute themselves across space 37 before passage into the upper end of reaction bed 21. Since these vapors are substantially cooler than any of the contact material, they will act to reduce the temperature of all parts of the contact material bed, but will reduce the temperature of the hotter region more than that of the relatively cooler ones, so that the temperature differentials across the bed will be substantially minimized.

Figure 4:
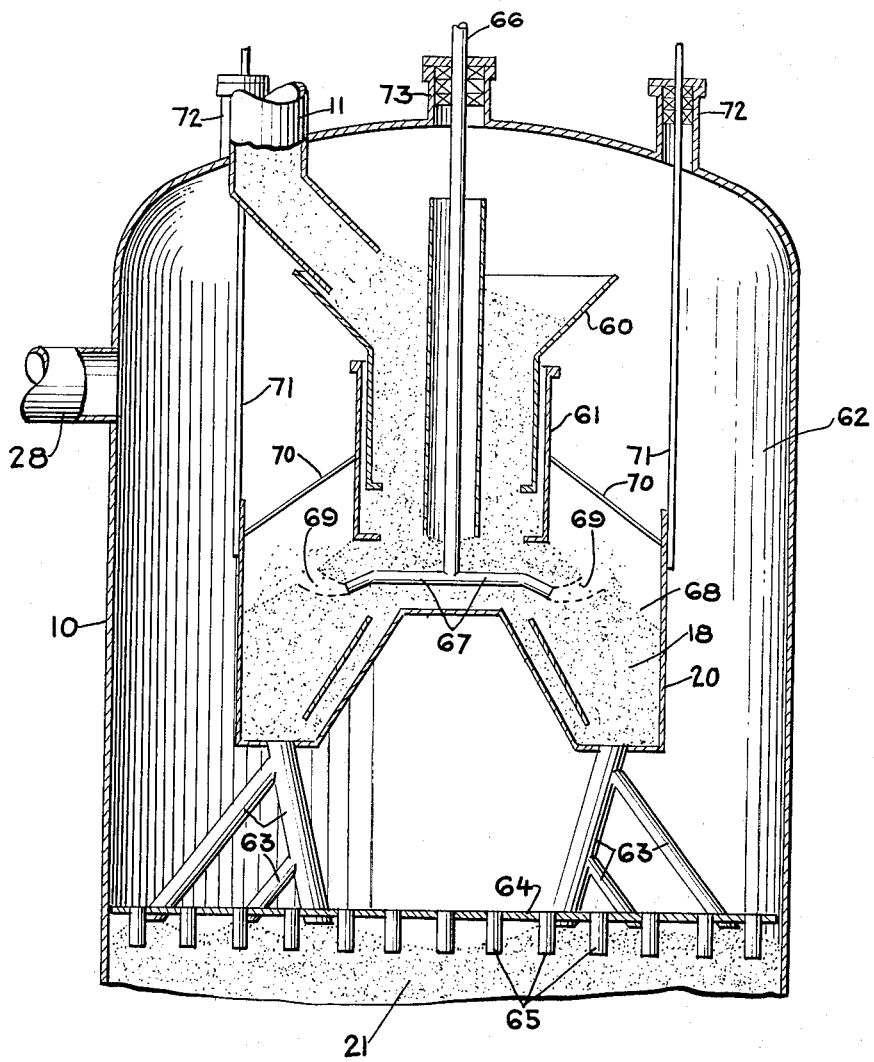
Figure 4 is a diagrammatic elevational view, partially in section, of the upper section of a hydrocarbon reactor employing a preferred form of this invention.

Figure 4 illustrates another of the preferred forms of this invention. The granular contact material enters reactor 10 by means of conduit 11 and passes via funnel-shaped member 60 and conduit 61 into open-topped cylindrical receptacle 20. The receptacle 20 of Figure 4 is less in lateral dimensions than reactor 10 and of relatively minor cross-sectional area when compared with the cross-sectional area of reactor 10. Receptacle 20 is spaced above reaction bed 21 and below the top of reactor 10 so that it is completely surrounded by gas space 62.

The solids stream from conduit 61 feeds the upper end of compact mass 18 maintained within receptacle 20. Contact material is continuously withdrawn from the lower end of mass 18 and passed to the upper surface of bed 21 as a plurality of confined streams which flow through conduits 63. A partition 64 extends completely across reactor 10 at a level above the lower ends of conduits 63 and above the upper surface of bed 21. A plurality of conduits 65 extend through this partition 64 downwardly into bed 21 below its upper surface.

A conduit 66 for the supply of liquid feed extends downwardly into reactor 10 and branches out into a plurality of conduits 67 which terminate at points below the open upper surface 68 of compact mass 18. In Figure 4 only that part of the hydrocarbon feed which cannot be supplied as a vapor enters through conduit 66. This liquid material enters, however, mixed with sufficient inert gaseous material, such as steam, to disrupt mass 18 at areas 69 from each of the points of injection to surface 68 in the manner described in connection with Figure 3. This disruption should preferably be controlled to obtain uniform, steady operation in the manner set forth below. In any case, the total disrupted areas of mass 18 is a relatively minor cross-section of the mass and the areas of disruption are all completely surrounded by compact contact material so that there is no metal erosion from the upwardly disrupted contact material.

The liquid charge which is injected from points 67 may be partially or even totally converted to vapor in disrupted areas 69. Any part that remains liquid is screened out of the upwardly flowing vapor by the contact material which is elevated upwardly onto the surface 68 of mass 18 in disrupted areas 69. The vapor hydrocarbons and other gaseous material passes into gas space 62.

Also supplied to gas space 62 through conduit 28 is that part of the hydrocarbon charge which can be vaporized without thermal conversion at the reactor temperature and pressure. All of this vapor then flows from gas space 62 through conduits 65 into bed 21. Since this vapor will be at a substantially uniform temperature which will be different, usually lower, than much of the contact material in the bed, it will have the effect of reducing the temperature gradient across the bed caused by differing temperatures of contact material supply to the bed.

In addition, it is desirable that conduits 65 be spaced less than 20 inches apart, and preferably less than 10 inches apart, center-to-center, to avoid additional temperature gradients due to the cross-flow of vapor and contact material, as is described and claimed in U.S. Patent 2,846,370 to Halik et al.

While the operation of the apparatus of Figure 4 has been described with a system supplying vapor and liquid charge components separately, it can just as easily and even preferably be used with the injection of all charge, liquid and vapor, into regions 69. The operation described, however, may be found desirable where more conventional prior art systems, for example, the conventional falling curtain feed system, using separate vapor and liquid supply, are replaced by this invention. The separate supply may be used to avoid revamping the piping system leading to the reactor where such a replacement is made.

There is one further feature disclosed in Figure 4. It is often desirable to vary the height of reaction bed 21. This is usually done to vary the ratio of gasoline to fuel oil produced in response to varying seasonal demands. It will be noted in Figure 4 that receptacle 20 is connected by means of rods 70 to conduit 61. Both members are suspended from one or more vertical rods 71 which extend upwardly and out of reactor 10 through stuffing boxes 72. These rods may be supported by conventional means (not shown) exterior to reactor 10. Plate 64 may be supported by conduits 63. Thus, when rods 71 are adjusted upwardly or downwardly, the effect will be to raise and lower the upper surface of bed 21. It is to be noted that the depth of mass 18 remains constant, however. The location of injection pipes 67 may also be adjusted with the receptacle 20 by moving pipe 66 through stuffing box 73.

Figures 5 and 6 illustrate an alternate device which may be used at the lower ends of passages 44 or 66, rather than manifold 45 and pipes 46 or pipes 66, in practicing this invention as described in Figures 3 and 4. In the device of Figures 5 and 6, a manifold 53 is formed between two conical members and is attached to the lower end of pipe 44 or 66. This manifold is of decreasing cross-section as it extends outwardly from 44 and is equipped with a continuous open outlet 48. Upright partitions 49 extend radially down manifold 59. Between each of partitions 49, above outlet 48, there is a plate 50 equipped with an aperture 51 of less area than the portion of outlet 48 between those two of partitions 49 in question. An upwardly curved baffle 52 is attached to the underside of the manifold and extends outwardly and upwardly beyond outlet 48.

In operation, the mixed liquid and vapor hydrocarbon feed passes from passage 44 into manifold 47 and through orifices 51. Since each of orifices 51 is smaller in cross-section than the portion of outlet 48 which they serve, they act as a throttling means and insure that all portions of outlet 48 receive an equal quantity of charge. Charge passes through the orifices and outlet 48, where it contacts contact material flowing in layer 41 of accumulation 18 and blows it upwardly onto the surface of the accumulation. In this operation the liquid is screened from the charge, with parts of it being immediately vaporized and cracked, by the contact material particles, and the vapor passes rapidly outwardly into vapor space 26 with only a very moderate reduction in temperature. In addition, those particles which are wetted by liquid are intimately mixed with particles which do not receive any liquid, and rapid heat transfer between the two results with resultant equalization of their temperatures. The operation then proceeds as described in connection with Figure 3 or Figure 4. Baffle 52 insures that substantially all of the contact material flowing in the region above manifold 53 will pass into the lift or disrupted region 47.

Figure 7:
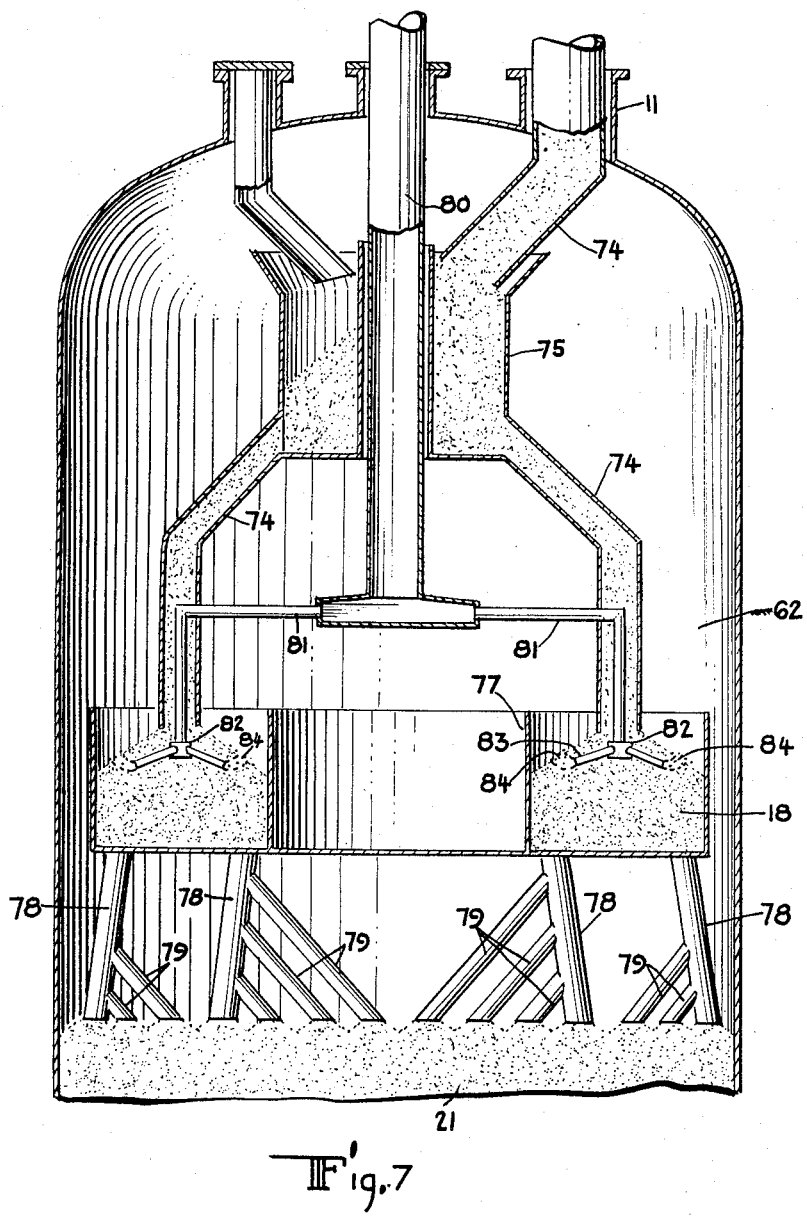
Figure 7 is a diagrammatic elevational view, partially in section, of the upper section of a hydrocarbon conversion reactor employing a preferred form of this invention.
Figure 8:
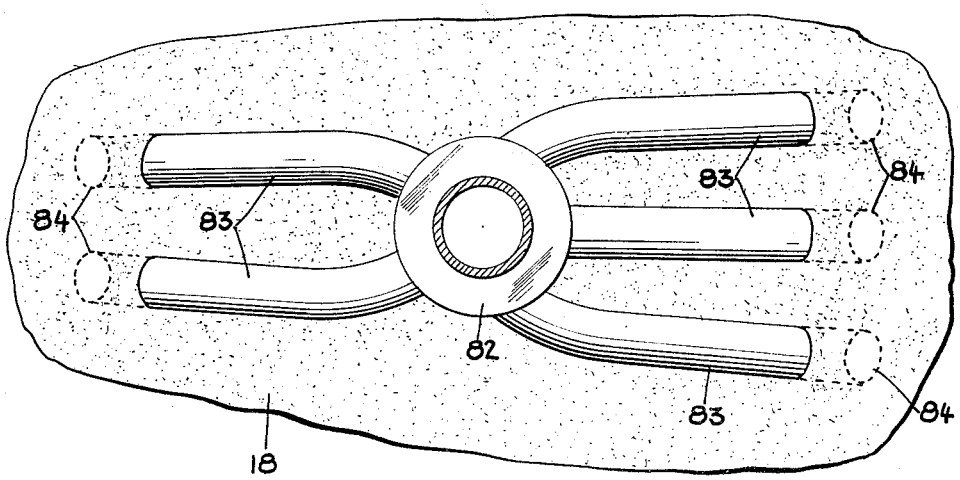
Figure 8 is a diagrammatic plan view of one of the fluid injection units employed in the apparatus of Figure 7.

Another of the more preferred forms of this invention is illustrated in Figures 7 and 8, which will be considered together. Hot granular solids enter the upper end of reactor 10 through conduit 11 in receptacle 75. From receptacle 75 a plurality of streams of compacted contact material 76 gravitate outwardly and then downwardly and terminate so as to deliver contact material into an annular-shaped receptacle 77. A compact accumulation 18 of contact material is formed within receptacle 77 from the contact material delivered by conduits 76. From the bottom of accumulation 77 a plurality of main streams 78 of compacted contact material are drawn. From these main streams a plurality of branch streams 79 are formed so that by means of streams 78 and 79 contact material feeds onto a plurality of spaced-apart areas on the surface of reaction bed 21. These areas should be spaced apart a distance less than 20 inches, preferably less than 10 inches and still more preferably less than 7 inches, center-to-center, to minimize the effects of temperature gradients that may be formed due to cross-flow of vapor at one temperature and contact material at another. This effect and the criticality of the spacing of these areas, as mentioned above, are described and claimed in U.S. patent application Serial No. 536,974, filed September 27, 1955.

The hydrocarbon charge enters reactor 10 as a mixture of liquid and vapor through conduit 80. This mixture is divided into a plurality of streams flowing through conduits 81. Each of conduits 81 terminates beneath a different one of conduits 76 and has a manifold 82 connected to its lower end. From each of manifolds 82 there extend a plurality of conduits 83. These conduits 83 and manifold 82 are shown in detail in Figure 8. It will usually be desirable to provide a throttling orifice at the entrance to each of conduits 83 to insure equal flow to each.

From each of conduits 83 there issues a stream of mixed liquid and vapor at a temperature substantially different from the temperature of the surrounding contact material. The mixed liquid and vapor issues at a velocity controlled in the manner set forth below, so that at each injection point there is formed a disrupted region 84 resembling a lift or fountain of catalyst. These disrupted areas are completely surrounded by compacted contact material in the remainder of mass 18 so that there is no erosion of metal walls which might permanently damage the structure. Likewise, the disrupted regions amount in total to only a minor fraction of mass 18. Vapors issuing from disrupted areas 84 pass into gas space 62 above receptacle 77 and then around receptacle 77 and into the upper end of reaction bed 21 between the areas covered by conduits 78 and 79.

Figure 9:
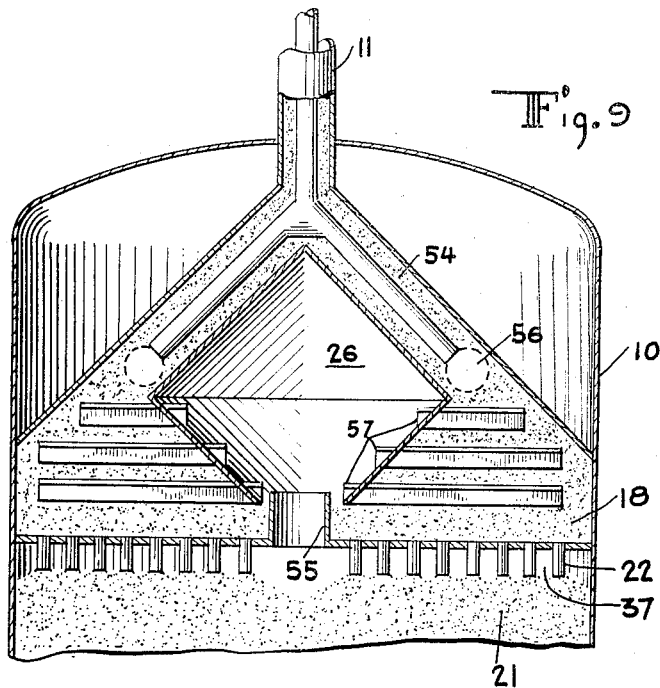
Figure 9 is a diagrammatic elevational, sectional view of a hydrocarbon conversion apparatus employing a less preferred form of this invention.

Another, less preferred modification of this invention is illustrated in Figure 9, where the entering contact material is expanded outwardly as a frusto-conical stream 54. The compact accumulation 18 of contact material is formed by an annular-shaped receptacle 55. Hydrocarbon charge, in mixed phase, is injected into stream 54 at a velocity sufficient to form a bubble 56, in and around which contact material and charge are mixed. Charge then flows downwardly to accumulation 18 and vapors are removed by conventional angle-roofed disengaging channels 57. These vapors pass into vapor space 26 and then downwardly through the central opening in receptacle 55 and distribute themselves across the space 37 beneath receptacle 55 and reaction bed 21. Vapors then flow into the reaction bed and, by reason of their lower temperature, act to minimize temperature differentials across the bed in the manner described above.

It is apparent that, in its broader forms, this invention, involving feeding charge to a separate contact material mass above the reaction bed, disengaging vapors from the mass and passing them to the bed out of contact with the contact material which flows from the mass to the bed, is applicable regardless of the particular specific technique which is used to get the charge into the mass.

Those forms of this invention in which the hydrocarbon charge is injected into mass 18 beneath an unconfined surface of the mass and allowed to disrupt the mass above the injection points are, in general, the most preferred forms. These preferred procedures are those illustrated generally in Figures 3, 4 and 7. Research with them has revealed that there is a particular mode of operation that is most desirable, and to achieve this mode of operation certain controls on the rate of hydrocarbon charge are critical. In this most desirable operation the disruption of the mass should resemble a steady fountain or lift of contact material.

Figure 10:
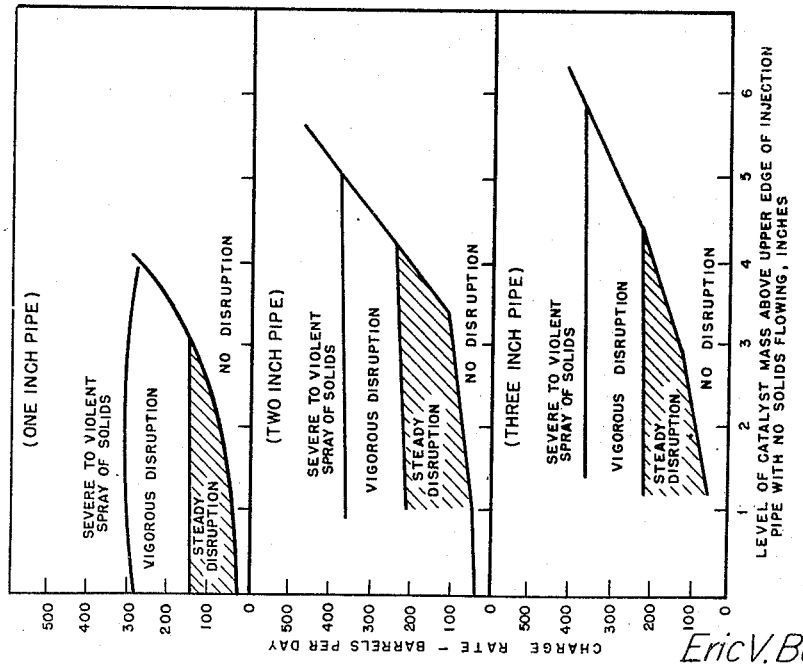
Figure 10 is a graph illustrating the various regions or types of operation of the more preferred forms of this invention.

The various types of operation of the preferred system are illustrated by Figure 10. The curves there shown were developed, using granular silica-alumina catalyst of a size averaging about 0.12 inch in diameter with a loose packed density of about 0.74. In developing Figure 10 a single injection pipe was embedded varying distances beneath the open upper surface of a contact material mass. Injection pipe size, charge rate and depth of the pipe beneath the mass surface were varied. Figure 10 illustrates that there are four different regions of flow in this system: (a) the mass is not disrupted, i.e., there is no vapor bubbling or boiling through the mass; (b) there is a steady, fountain-like disruption or boiling of the mass; (c) there is a perceptibly more vigorous disruption or boiling; and (d) the disruption or boiling is very violent and sprays catalyst about and out of the container in which the mass is confined. The disruption, of course, is only in a limited area of the mass above the injection pipe.

The region in which there is no disruption is undesirable, of course, because the liquid component of the charge may not be mixed with substantial amounts of solids but run down through the mass and form large quantities of coke therein. Even where adequate mixing occurs, or where a bubble forms beneath the surface of the mass without disruption, pressure drop will be high.

The steady disruption region is the most desirable region of operation. In it the solid particles are gently lifted from the point of charge injection to a level shortly above the surface of the mass and then drop back onto the mass surface. There is little solids breakage and the vapor is disengaged from the mass rapidly.

The area of vigorous disruption is less satisfactory generally because the intensity of the disruptive action leads to a less uniform contacting of charge and solids and to greater breakage of the solids.

The region of violent catalyst spraying is unacceptable for commercial use because of severe solids breakage and flowing of the solids out of the container holding the mass.

From a study of Figure 10 it will be apparent that the charge rate at which a given system shifts from steady disruption to vigorous disruption and from vigorous disruption to violent does not change appreciably with varying depths of immersion of the injection point in the mass for a given size injection pipe. The charge rates at which these shifts occur do vary with the size of the injection pipe, however. On the other hand, the point at which disruption begins (the lower limit of the steady disruption region) does vary markedly with the depth of immersion of the injection pipe but does not seem to be materially affected by injection pipe size.

Figure 11:
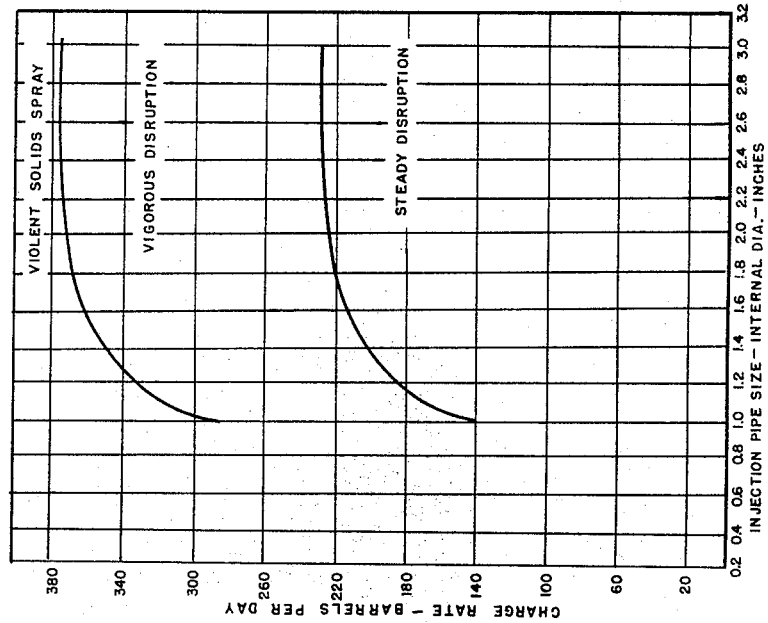
Figure 11 is a graph illustrating the effect of injection pipe size on allowable charge rate in the preferred forms of this invention.

If, then, charge rate is plotted against pipe size for the regions of transition from steady to vigorous disruption and for vigorous to violent disruption, as in Figure 11, two curves of general applicability are obtained. The lower of these curves defines the transition from the preferred steady disruption region to the less preferred vigorous disruption region and the upper curve defines the transition from the vigorous disruption region to the unsatisfactory region where the solids are sprayed about violently. These curves may be expressed in equation form.

For operation within the preferred steady disruption region, the charge rate to the single injection point should not exceed the charge rate determined from the following equation:

(Equation 1) $\quad W = 231 - 90D^{-3.87}$

For operation within the less preferred vigorous disruption range, the charge rate to the single injection point should not exceed the charge rate determined from the following equation:

(Equation 2) $\quad W = 376 - 90D^{-3.87}$

In both of these equations W is the charge rate of hydrocarbon material in barrels (42 gal.) per day, which either enters as vapor or is converted to vapor within the disrupted area. D is the diameter of the injection pipe at its outlet in inches. In using these equations and those that follow it is normally safe to assume that all liquid hydrocarbon supplied to the disrupted area is vaporized by distillation or cracking. The foregoing Equations 1 and 2 are limited to a particular charge stock. They may be made generally applicable to all charge stocks by applying a further factor so that the upper limit of the preferred steady boiling range becomes (Equation 3) $\quad W = \dfrac{S^{0.59}(157 - 62D^{-3.87})}{Z^{0.18}}$ and the upper limit of the less preferred vigorous disruption range is (Equation 4) $\quad W = \dfrac{S^{0.59}(257 - 62D^{-3.87})}{Z^{0.18}}$ W and D, as used in these equations, are as defined above. S is the density of the vapor in the charge material supplied and formed from the charge material in the disrupted area in pounds per cubic foot. In calculating S, any steam or other inert gas supplied with the hydrocarbon should be included. Z is the viscosity of the charge material used in determining S in centipoises.

The term "barrel," as used above in connection with W and in connection with the graphs which are a part of this application, as well as elsewhere herein, should be understood, as is conventional, to mean 42 U.S. gallons of liquid measured at 60° F. When applied to hydrocarbon charge rates, all of the hydrocarbon charge which is liquid at 60° F. is included in the rate.

Figure 12:
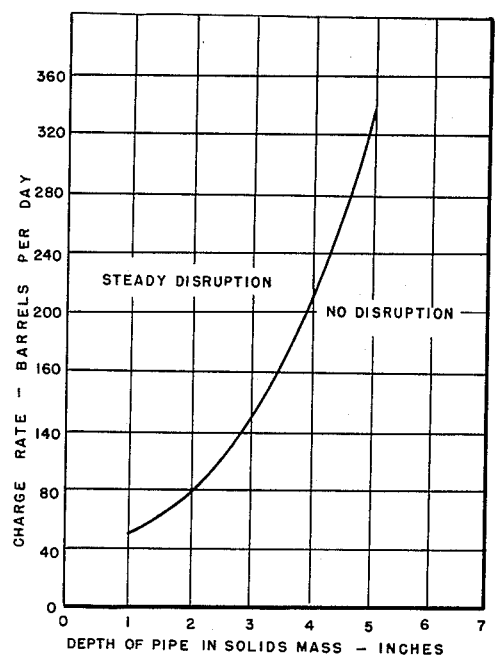
Figure 12 is a graph illustrating the effect of the depth of the injection point on the charge rate required to disrupt the mass in the preferred forms of this invention.

As indicated above, the charge rate that must be exceeded to disrupt the compact mass of contact material varies with charge rate and depth of the injection pipe in the solids mass. Figure 12 illustrates this variation for a single pipe injection and a particular charge stock. The equation for the curve of Figure 12 which defines the charge rate that must be exceeded to operate in a satisfactory manner is (Equation 5) $\quad W = 6Y^{2.4} + 47$ where W is as defined above and Y is the depth of the injection pipe beneath solids mass surface as its outlet end. The measurement of Y is made with the mass in a "no flow" condition from the mass surface to the upper edge of the outlet of the injection passage.

Equation 5 may be modified so as to be applicable to any charge stock, thereby producing the following:

(Equation 6) $$W=\frac{S^{0.59}(4Y^{2.4}+32)}{Z^{0.18}}$$

As previously indicated, all of the foregoing equations apply to use of only a single injection point located within a compact mass of contact material beneath an unconfined surface of the mass. As indicated, to achieve disruption of the mass, a charge rate in excess of that defined by Equation 6 is required. It is preferred that the charge rate not exceed the rate determined by Equation 3. A less preferred but still satisfactory operation may be obtained above the rate determined by Equation 3, provided that in no case is the rate defined by Equation 4 exceeded.

Figure 13:
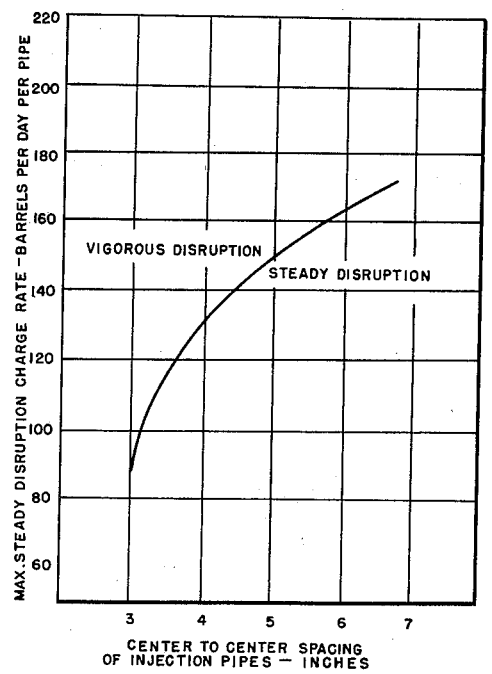
Figure 13 is a graph illustrating the effect of center-to-center spacing of injection points on allowable charge rate in a multipoint injection system employing preferred forms of this invention.

In most applications of this invention it will be desirable to employ more than a single injection pipe in order to be able to inject a commercially feasible quantity of charge stock. Experimentation has determined that, in addition to the variables noted above, the minimum and maximum charge rates are influenced by the average center-to-center spacing of the injection pipes in a multiple injection system. Figure 13 illustrates this for one charge stock and a system employing three 1½ inch pipes at an unvarying depth beneath the surface of the solids mass. The curve shown in Figure 13 defines a line between the preferred steady boiling region and the less preferred vigorous boiling region. Similar curves have been determined for the limits on the other regions noted above. The information developed from curves like Figure 13 may then be used to modify the foregoing equations to make them generally applicable to any charge stock and with any number of injection points. Thus, the charge rate per pipe to achieve disruption should at all times exceed the charge rate determined by the following equation:

(Equation 7)
$$W=\frac{S^{0.59}(4Y^{2.4}-23L^{-1.8}Y^{2.4}+32)}{Z^{0.18}}$$

Broadly, the charge rate per pipe should not exceed (vigorous disruption)

(Equation 8)
$$W=\frac{S^{0.59}(257-62D^{-3.87}-356L^{-1.31})}{Z^{0.18}}$$

and preferably the charge rate should not exceed (steady disruption)

(Equation 9)
$$W=\frac{S^{0.59}(157-62D^{-3.87}-356L^{-1.31})}{Z^{0.18}}$$

In these equations, as above, W is the charge rate (maximum or minimum) per injection pipe expressed in barrels per day of hydrocarbon charge which is either supplied as a vapor or is converted to vapor within the disrupted area. Stated in another fashion, W is the total charge rate in barrels per day of hydrocarbon less the quantity, in barrels per day, of the total charge which is not vaporized in the disrupted area. D is the diameter of the injection pipe at its outlet in inches. S is the density of all gaseous material, hydrocarbon and any inert gas, in disrupted area, in pounds per cubic foot. Z is the viscosity of the gaseous material (as defined in S) at the injection points in centipoises. Y is the depth of the outlet of the injection passageway beneath the surface of the contact material mass in inches. Y should be measured from the contact material surface which exists when contact material is not flowing to the upper edge of the injection passageway outlet. L is the center-to-center distance between injection passage outlets in inches. It is to be noted that Equations 7, 8 and 9 may also be applied to single injection pipe systems, provided that L is considered to be zero for such systems. With L as zero, Equations 7, 8 and 9 become identical with Equations 3, 4 and 6.

The foregoing equations may be further generalized to allow for variations in contact material particle size and density. Thus, for a single injection point, the charge rate which must be exceeded to disrupt the mass is (Equation 10)
$$W=\frac{S^{0.59}(4Y^{2.4}+32)}{Z^{0.18}}\left(\frac{De}{0.12}\right)^{0.77}\left(\frac{\rho}{0.74}\right)^{0.59}$$

In this equation and in the ones that follow, De is the average particle diameter of the contact material into which feed is injected in inches, and $\rho$ is the density of the contact material in the so-called "loose packed" condition in grams per cubic centimeter. This loose packed density may be measured by filling a container of known volume with the contact material, weighing the contact material and dividing this weight by the volume. Obviously, this density includes both the void spaces between the particles and the volume of any pores in the solids. Thus, it will be lower than the density of any individual particle and still lower, for porous particles, than the density of the solid material making up the particle.

With a single injection point the upper limit of the vigorously disrupted range is (Equation 11)
$$W=\frac{S^{0.59}(257-62D^{-3.87})}{Z^{0.18}}\left(\frac{De}{0.12}\right)^{0.77}\left(\frac{\rho}{0.74}\right)^{0.59}$$

With a single injection point the upper limit of the preferred steady disrupted range is (Equation 12)
$$W=\frac{S^{0.59}(157-62D^{-3.87})}{Z^{0.18}}\left(\frac{De}{0.12}\right)^{0.77}\left(\frac{\rho}{0.74}\right)^{0.59}$$

Similarly, Equations 7, 8 and 9, dealing with multipoint injection, may be generalized as to catalyst size and density. Thus, the charge rate per injection pipe should at all times, to achieve disruption, exceed the charge rate determined by the following equation:

(Equation 13)
$$W=\frac{S^{0.59}(4Y^{2.4}-23L^{-1.8}Y^{2.4}+32)}{Z^{0.18}}\left(\frac{De}{0.12}\right)^{0.77}\left(\frac{\rho}{0.74}\right)^{0.59}$$

Broadly, the charge rate per pipe should not exceed (vigorous disruption).

(Equation 14)
$$W=\frac{S^{0.59}(257-62D^{-3.87}-356L^{-1.31})}{Z^{0.18}}\left(\frac{De}{0.12}\right)^{0.77}\left(\frac{\rho}{0.74}\right)^{0.59}$$

and preferably the charge rate should not exceed (steady disruption).

(Equation 15)
$$W=\frac{S^{0.59}(157-62D^{-3.87}-356L^{-1.31})}{Z^{0.18}}\left(\frac{De}{0.12}\right)^{0.77}\left(\frac{\rho}{0.74}\right)^{0.59}$$

Equations 13–15 are the most general of the equations presented and all of the various quantities used in them are defined elsewhere herein. They may even be used for single injections pipe systems, provided that L is considered to be zero for such systems.

It will be understood that, while the foregoing equations define generally the transition between the various conditions of operation of the preferred form of this invention in which the contact material mass is disrupted, there is a range of transition rates of flow when the disrupted region is passing from one type of operation or condition to another. The equations given locate the regions satisfactorily for effective design and operation of the preferred form of mixed feed system with the desirable operating ranges.

Figure 14:
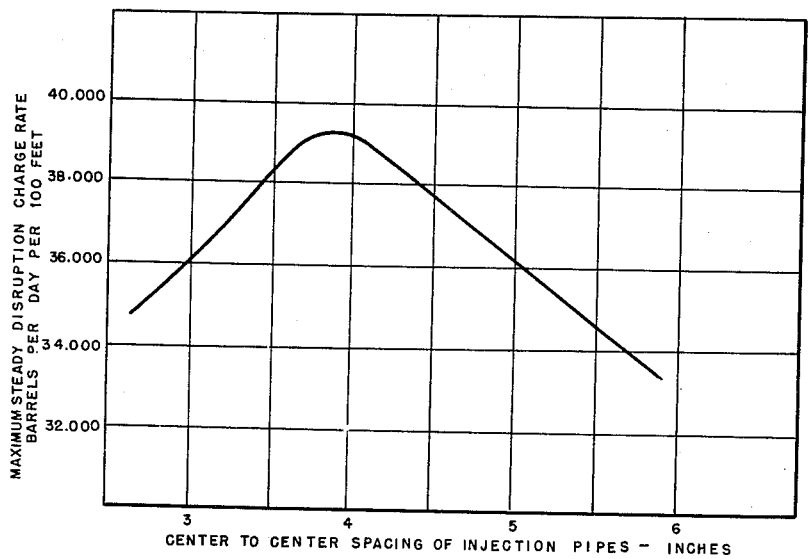
Figure 14 illustrates a critical spacing of injection pipes in multipipe injection systems employing preferred forms of this invention.

An important practical factor in commercial design is the maximum quantity of charge stock that can be injected into a fixed area of contact material. It might be expected that the more injection pipes that were put into the area the greater would be its capacity. It was found, however, that this was not the case when the pipes were quite close to each other, as illustrated in Figure 14. Plotted there is the curve for the maximum upper limit of the preferred steady disruption region of operation as the charge rate in barrels per day per 100 feet of length of contact material mass against the center-to-center spacing of the injection pipes in inches. In determining this curve as the spacing of the injection pipes becomes less, of course, more pipes are added to fill up the 100 foot length. At higher spacings of injection pipes, therefore, the total charge rate to the 100 foot length increases as the spacing is reduced. However, just below a spacing of 4 inches a maximum is reached and closer spacings result only in a decreased total maximum allowable charge rate, even though more injection pipes are needed to achieve the spacing. Thus, Figure 14 makes clear that to achieve maximum capacity from a fixed size contact material mass and still remain within the preferred steady disruption region, adjacent injection pipes should be spaced apart within the range about 3 to 5 inches center-to-center. It is believed that a similar spacing would be required to achieve maximum charge injection in the vigorous disruption region.

In determining all of the aforementioned equations and curves, the depth of injection was varied from 1 to 6 inches. In multiple injection systems the injection systems the injection pipe spacing was varied from 3 to 6 inches. It is believed, however, that the limits defined by the equations are generally applicable outside these ranges.

Also, it was assumed that, in addition to the hydrocarbon charge, steam in the amount of 3 percent of the weight of the hydrocarbon supplied was charged with the hydrocarbon. It is believed, however, that the general limits which the equations define are applicable at other rates of steam supply, particularly because it is believed that the steam, with its low molecular weight, does not materially aid in disrupting the contact material. In an operation, like that of Figure 4, the chief function of the steam is to disperse the liquid so that it will crack into vapor which will disrupt the mass.

It will be noted from Figure 10 that when the injection point or points are located too far below the surface of the catalyst mass, it is not possible to operate in the steady boiling region. The operation will, as the charge rate is increased, go from the no disruption region directly into the vigorous disruption or violent spray regions. Similarly, if the injection point or points are even further embedded, it is not possible to enter the vigorous disrupting regions. When it is not possible to enter a region it will show up in the foregoing equations by the calculated maximum charge rate for the region being below the calculated minimum charge rate needed to induce bubbling or disruption.

In all of the species of this invention the velocity in the injection pipes should be above 30 feet per second and preferably above 70 feet per second to prevent coking in the pipes.

*Example I*

In a system operated according to this invention and suitable for charging 25,000 barrels per day of hydrocarbon charge as a mixture of liquid and vapor and in general designed along the lines of Figure 7, 180 injection pipes spaced 4⅜ inches apart center-to-center might be used. The reactor might by cylindrical and 16 feet in diameter with annular receptacle 77 being 10 feet 10 inches in diameter. The injection pipes were 1½ inch standard pipe and extended to a point one foot beyond the center line of the lower end of passage 76. The lower end of each of passages 76 might be rectangular in shape and about 10 inches along the radius of the reactor and 20 inches across the other dimension. There were two mixed feed manifolds of the type shown in Figure 8 beneath each of conduits 76. In operating this unit, a granular silica-alumina cracking catalyst, having an average particle diameter of 0.12 inch and a loose packed density of about 0.74, was used and the ends of the injection pipes were embedded 2 inches below the catalyst mass surface. The vapor at the injection points might have a density of 0.46 pound per cubic foot and a viscosity of 0.015 centipoise. Applying Equations 13, 14 and 15, the minimum charge rate to achieve steady bubbling would be 60 barrels per day per pipe, the maximum charge rate of the steady bubbling region would be 140 barrels per day per pipe and the maximum charge rate for the vigorous bubbling region would be 240 barrels per day per pipe. The actual charge rate to the unit amounted to 139 barrels per day per pipe.

*Example II*

As a further example of this invention, a design for a 15,000 barrel per day Thermofor catalytic cracking reactor, similar to that of Figure 3, will be described. The catalyst used was synthetically prepared silica-alumina bead catalyst and catalyst was circulated through the unit at the rate of about 350 tons per hour. The conversion vessel 10 was cylindrical and about 16 feet in diameter while receptacle 19 was 15 feet in diameter. There were 28 of conduits 40 which were 8 inch pipes spaced uniformly apart. Beneath each of conduits 40 was a circular manifold 45 spaced away from the lower end of pipe 40 to allow contact material to flow from the pipe. Twelve 1 inch pipes 46 extended radially from each manifold with outlet ends directed along the line of contact material flow in high spaced layer 41. These outlet ends were in a circular pattern of 12 inches in diameter and were about 2 inches below the upper surface of accumulation 18. Pipes 22, extending from receptacle 19, were spaced apart uniformly on 7 inch centers. Contact material would be supplied to this reactor at 1050° F. while mixed phase charge would be supplied at 800° F.

This invention should be understood to include all changes and modifications of the examples of the invention, herein chosen for purposes of disclosure, which do not constitute departures from the spirit and scope of the invention.

I claim:

1. A continuous process for the conversion of fluid hydrocarbons in the presence of a moving mass of granular contact material, which comprises: maintaining a downwardly gravitating, substantially compact reaction bed of contact material within the lower section of an enclosed housing; passing a substantially compact feed stream of contact material of substantially less horizontal cross-section than said housing downwardly into the upper section of said housing; maintaining within said stream a peripheral region of high velocity contact material flow and a central region of substantially lower velocity contact material flow, injecting liquid hydrocarbon charge, at a temperature substantially below the temperature of the contact material, only into said high velocity region and allowing the vapors formed therefrom to expand into said lower velocity region; supplying said stream to a confined accumulation of contact material above said reaction bed of horizontal cross-sectional area approaching but less than that of said housing; supplying contact material from the central region of said stream to the central section of said accumulation and expanding the contact material from said peripheral region of said stream outwardly across the annular section surrounding the central section of said accumulation; passing granular contact material from the lower section of said accumulation onto the upper surface of said reaction bed as a plurality of streams uniformly spaced apart with respect to the area of said bed; disengaging vapors from said accumulation and passing said vapors around said accumulation and into the upper end of said bed and then downwardly through said bed to effect the desired conversion; removing the products of conversion from the lower section of said bed and removing used contact material from the lower section of said bed.

2. A method for the continuous conversion of fluid hydrocarbons, at least a portion of which must be supplied to the conversion zone in the liquid phase, by means of a downwardly moving, substantially compact reaction bed of granular contact material, which comprises: maintaining said reaction bed within the lower section of an enclosed housing; passing a confined, substantially compact stream of fresh contact material at a temperature suitable to effect the desired conversion reaction into the upper section of said housing; maintaining a substantially compact accumulation of contact material within said housing above said reaction bed, said accumulation having lateral dimensions approaching but less than those of said housing; gravitating said contact material from said feed stream onto the upper end of said accumulation; gravitating contact material from the lower end of said accumulation onto the upper surface of said reaction bed as a plurality of uniformly spaced-apart, confined, compact streams; maintaining at least a portion of the upper surface of said acccumulation open to a gas space maintained thereabove within said housing; inducing within the lower section of said feed stream a region of high velocity contact material flow through which a major portion of the contact material to be supplied to said reaction bed passes, and an adjacent region of substantially lower velocity of contact material flow; injecting the liquid portion of the hydrocarbon charge, at a temperature substantially below the temperature of the contact material in the region of injection, into said high velocity region at a plurality of horizontally spaced-apart points; injecting with said hydrocarbon charge a sufficient quantity of gaseous material to cause the gaseous mass velocity at each of said injection points to exceed the boiling mass velocity and thereby form a gas bubble at each of said points which accomplishes mixing of liquid hydrocarbons and contact material; passing the vapors formed from said liquid hydrocarbons downwardly into said accumulation; disengaging said vapors from the open surface of said accumulation and passing said vapors around said accumulation and into the open area of the upper surface of said reaction bed between said plurality of contact material streams; passing the portion of the charge which is supplied as a vapor into the upper end of the reaction bed in the area between said streams; passing hydrocarbon charge downwardly through said bed to effect the desired conversion; removing gaseous products of conversion from the lower section of said reaction bed and removing used contact material from the lower section of said bed.

3. An apparatus for the conversion of fluid hydrocarbons in the presence of a moving mass of granular contact material, which comprises in combination: an enclosed conversion vessel adapted to contain a downwardly gravitating, substantially compact bed of granular contact material in its lower section, members defining a passageway for contact material flow extending into the upper section of said vessel and terminating therein; a hood attached to the lower end of said passageway, said hood having a frusto-conical upper section and a cylindrical lower section of substantially less horizontal cross-sectional area than said vessel and terminating on its lower end within the upper section of said vessel; a baffle symmetrically within said hood in the shape of an inverted cone, the upper end of said baffle having a horizontal cross-sectional area amounting to a major fraction of the horizontal cross-sectional area of said hood, so that an annular passageway for contact material is formed between the upper end of said baffle and said hood; at least one hoop baffle in the shape of a hollow frustum of a cone, the upper end of said baffle enclosing a horizontal cross-sectional area amounting to a major fraction of the horizontal cross-sectional area of said hood, so that contact material flowing in said hood will be divided into a narrow peripheral region of flow and a central region of flow; a liquid spray ring lying on a horizontal plane within said hood with a diameter greater than the diameter of the upper end of said hoop baffle and having a plurality of spaced-apart orifices through its underside; means for supplying liquid hydrocarbon charge to said ring; a cylindrical receptacle, of horizontal cross-sectional area less than but approaching the horizontal cross-sectional area of said vessel, situated centrally on a horizontal plane within said vessel at a level below the lower end of said hood and adapted to receive contact material discharged from said hood; a plurality of vertical conduits for contact material flow extending downwardly from the bottom of said receptacle and terminating within the upper section of said vessel; means for removing the products of conversion from the lower section of said vessel; and means for removing contact material from the lower section of said vessel.

4. An apparatus for the supply of hydrocarbon charge to a downwardly gravitating, substantially compact reaction bed of contact material maintained within the lower section of a conversion chamber, which comprises in combination: an open-topped receptacle situated within the upper section of said chamber and having lateral dimensions less than those of said chamber; a plurality of uniformly spaced pipes with open inlets adjacent the bottom of said receptacle extending tightly through the bottom of said receptacle to a common level shortly therebelow within the upper section of said chamber; a plurality of contact material feed pipes extending into the upper section of said chamber and terminating substantially above the bottom of said receptacle with discharge ends situated to discharge contact material into said receptacle; a hydrocarbon feed manifold situated immediately beneath each of said contact material feed pipes and laterally partitioned so as to inject hydrocarbon charge at a plurality of points situated in a circular pattern beneath each of said feed pipes, each of said points being laterally removed from the downward projection of said feed pipes and each of said hydrocarbon charge passageways having its discharge end below imaginary lines drawn downwardly from the outlet edge of said contact material feed pipes at angles at 30 degrees with the horizontal; an orifice plate having a flow restricting orifice of less cross-section than the outlet of said charge passageways upstream of the outlet of each of said passageways, a baffle suitable to deflect hydrocarbon charge upwardly attached to the outlet at each of said charge passageways and means for supplying hydrocarbon charge at a temperature below the contact material temperature to said manifold.

5. A process for the conversion of fluid hydrocarbons to lower boiling gaseous products in the presence of a moving compact bed of granular contact material maintained within an enclosed housing, which comprises: maintaining a substantially compact mass of granular contact material within said housing spaced above the upper surface of said bed, said mass being spaced away from the upper end of said housing and of less lateral dimensions than said housing so that a gas space surrounds said mass and said mass having at least a part of its upper surface unconfined and in open communication with said gas space; supplying at least one confined, substantially compact stream of contact material to the upper surface of said mass; flowing liquid hydrocarbon charge at a temperature substantially different from the contact material temperature into said mass beneath said unconfined surface by means of a plurality of confined passages with outlet ends laterally removed from the projection of the lower end of said stream; flowing a gaseous material into said mass with said liquid charge in sufficient quantity to maintain the velocity in said passage greater than 30 feet per second and the total rate of supply of fluid material which will exist as vapor at the temperature and pressure of the mass in barrels per day injected at each injection point being in excess of $$\frac{S^{0.59}(4Y^{2.4} - 23Y^{2.4}L^{-1.8} + 32)}{Z^{0.18}} \left(\frac{De}{0.12}\right)^{0.77} \left(\frac{\rho}{0.74}\right)^{0.59}$$

but less than $$\frac{S^{0.59}(157 - 62D^{-3.87} - 356L^{-1.31})}{Z^{0.18}} \left(\frac{De}{0.12}\right)^{0.77} \left(\frac{\rho}{0.74}\right)^{0.59}$$

where S is the vapor density of the fluid charged in pounds per cubic foot at the temperature and pressure in the conversion zone at the injection point, Z is the viscosity as a vapor of the fluid charged in centipoises at the temperature and pressure of the injection point, Y is the depth of the point of injection below the unconfined surface in inches, D is the diameter of the confined passage from which the charge issues in inches, L is the center-to-center distance between the injection point and the next adjacent point in inches, De is the average diameter of the contact material particles in inches, $\rho$ is the loose packed density of the contact material particles in grams per cubic centimeter, whereby said mass is disrupted in the region above said injection points, said disrupted area amounting to only a minor fraction of the total area of said mass; rapidly disengaging vapors through the disrupted area into the gas space thereabove; supplying a separate stream of hydrocarbon vapor charge to said gas space at a temperature different from the temperature of contact material supply to said mass to mix with vapors disengaged from said mass; and flowing vapor from said gas space around said mass and into said bed separately of the contact material which flows from said mass to said bed.

6. The method for supplying fluid hydrocarbon charge, at least partially in the liquid phase, to the conversion zone of processes employing granular solid contact material as a compact moving bed maintained within the lower section of a housing, through which bed hydrocarbon charge to be converted passes in concurrent flow with the moving contact material, which comprises: maintaining a substantially compact mass of contact material within said housing and above said bed, said mass being less in lateral dimensions than said bed and having at least a part of its upper surface unconfined and in open communication with a gas space within said housing around said mass; continuously passing contact material from the lower section of said mass to the upper section of said bed; continuously supplying fresh hot contact material as at least one confined, substantially compact stream to the upper surface of said mass; injecting hydrocarbon charge at a single point within said mass at a position laterally removed from the projection of the lower end of the stream which supplies contact material to said mass, the rate of injection being such that the part of the fluid charge which exists as a vapor at the temperature and pressure of the injection point will enter at a rate in barrels per day which is in excess of $$\frac{S^{0.59}(4Y^{2.4} + 32)}{Z^{0.18}} \left(\frac{De}{0.12}\right)^{0.77} \left(\frac{\rho}{0.74}\right)^{0.59}$$

but less than $$\frac{S^{0.59}(257 - 62D^{-3.87})}{Z^{0.18}} \left(\frac{De}{0.12}\right)^{0.77} \left(\frac{\rho}{0.74}\right)^{0.59}$$

where S is the vapor density of the fluid charged in pounds per cubic foot at the temperature and pressure in the conversion zone at the injection point, Z is the viscosity as a vapor of the fluid charged in centipoises at the temperature and pressure of the injection point, Y is the depth of the point of injection below the unconfined surface in inches, D is the diameter of the confined passage from which the charge issues in inches, De is the average diameter of the contact material particles in inches, $\rho$ is the loose packed density of the contact material in grams per cubic centimeter, whereby the region of said mass immediately above said injection point is disrupted but the total disrupted area is only a minor fraction of the total area of said mass, and whereby vapors disengage rapidly through said disrupted area into said gas space; flowing vapors from said gas space around said mass and into the upper surface of said bed and removing the products of conversion from said bed at a level below the upper surface of said bed.

7. The process of claim 6 wherein the rate of supply of the part of fluid charge which exists as vapor at the temperature and pressure of the injection point in barrels per day is not in excess of $$\frac{S^{0.59}(157 - 62D^{-3.87})}{Z^{0.18}} \left(\frac{De}{0.12}\right)^{0.77} \left(\frac{\rho}{0.74}\right)^{0.59}$$

8. A method for supplying fluid hydrocarbon charge, at least partially in the liquid phase, to the conversion zone of processes employing granular solid contact material as a compact moving bed maintained within the lower section of a housing, through which bed hydrocarbon charge to be converted passes in concurrent flow with the moving contact material, which comprises: maintaining a substantially compact mass of contact material within said housing and above said bed, said mass being less in lateral dimensions than said bed and having at least a part of its upper surface unconfined and in open communication with a gas space within said housing around said mass; continuously passing contact material as a plurality of spaced-apart, confined, compact streams from the lower section of said mass to the upper section of said bed; supplying fresh hot contact material as at least one confined, substantially compact stream to the upper surface of said mass; injecting hydrocarbon charge, at least partially in the liquid phase and at a temperature substantially different from the temperature at which contact material is supplied to said mass, into said mass at a level below said unconfined surface and laterally removed from the projection of the lower end of said stream of fresh contact material supplied to said mass, said injection being at a plurality of injection points spaced within said mass and from a plurality of confined passages at a rate such that the rate of supply in barrels per day at each such injection point of the part of said charge which will exist as vapor at the temperature and pressure of the injection point is in excess of $$\frac{S^{0.59}(4Y^{2.4} - 23Y^{2.4}L^{-1.8} + 32)}{Z^{0.18}} \left(\frac{De}{0.12}\right)^{0.77} \left(\frac{\rho}{0.74}\right)^{0.59}$$

but less than $$\frac{S^{0.59}(257 - 62D^{-3.87} - 356L^{-1.31})}{Z^{0.18}} \left(\frac{De}{0.12}\right)^{0.77} \left(\frac{\rho}{0.74}\right)^{0.59}$$

where S is the vapor density of the fluid charged in pounds per cubic foot at the temperature and pressure in the conversion zone at the injection point, Z is the viscosity as a vapor of the fluid charged in centipoises at the temperature and pressure of the injection point, Y is the depth of the point of injection below the unconfined surface in inches, D is the diameter of the confined passage from which the charge issues in inches, L is the center-to-center distance between the injection point and the next adjacent injection point in inches, De is the average diameter of the contact material particles in inches, $\rho$ is the loose packed density of the contact material in grams per cubic centimeter, whereby the region of said mass above said adjection points is disrupted but the total disrupted area is only a minor fraction of the total area of said mass; flowing any vapors which are injected as a part of said charge and any vapors formed from the liquid portion of said charge upwardly through the disrupted area and through the open surface of said mass into said gas space; flowing vapors from said gas space around said mass and into the upper surface of said bed and removing products of conversion from said bed at a level below its upper surface.

9. The process of claim 8 further limited to the charge rate in barrels per day of material which is vapor at each injection point being less than $$\frac{S^{0.59}(157-62D^{-3.87}-356L^{-1.31})}{Z^{0.18}}\left(\frac{De}{0.12}\right)^{0.77}\left(\frac{\rho}{0.74}\right)^{0.59}$$

10. The process of claim 8 where said injection points are arranged with the center-to-center distance between adjacent injection points being within the range 3 to 5 inches.

11. A method for supplying fluid hydrocarbon charge, as a mixture of liquid and vapor, to the conversion zone of processes employing granular solid contact material as a compact moving bed maintained within the lower section of a housing, through which bed hydrocarbon charge to be converted passes in concurrent flow with the moving contact material, which comprises: maintaining a substantially compact mass of contact material within said bed, said mass being less in lateral dimensions than said bed and having at least a part of its upper surface unconfined and in open communication with a gas space within said housing around said mass; supplying hot contact material as at least one confined, substantially compact stream to the upper surface of said mass; continuously passing contact material as a plurality of spaced-apart, confined, compact streams from the lower section of said mass to the upper section of said bed; injecting hydrocarbon charge as a mixture of liquid and vapor into said mass at a plurality of points which are laterally removed from the projection of the lower end of the stream that supplies the upper surface of said mass and less than 6 inches below the upper surface of the mass, said mixture of liquid and vapor hydrocarbon being at a temperature substantially different from the temperature at which contact material is supplied to said mass and the velocity of injection of hydrocarbons at each injection point and the velocity of upward flow of said hydrocarbons being such that the mass above the injection point is disrupted and contact material particles transferred from the interior of said mass to the surface of said mass in a steady, fountain-like flow through the disrupted area while hydrocarbon vapor flows through said disrupted area into said gas space, the total area so disrupted being only a minor fraction of the horizontal cross-sectional area of the mass; flowing hydrocarbon vapor from said gas space around said mass and into the upper end of said bed and removing products of conversion from said bed at a level below the upper surface of the bed.

References Cited in the file of this patent

UNITED STATES PATENTS 2,771,406    Ray _____ Nov. 20, 1956

UNITED STATES PATENT OFFICE
CERTIFICATION OF CORRECTION

Patent No. 2,956,011                                October 11, 1960

Eric V. Bergstrom

It is hereby certified that error appears in the above numbered patent requiring correction and that the said Letters Patent should read as corrected below.

In the grant (only), line 1, name of inventor, for "Eric V. Gergstrom" read -- Eric V. Bergstrom --.

Signed and sealed this 2nd day of May 1961.

(SEAL)
Attest:

ERNEST W. SWIDER                                     DAVID L. LADD
Attesting Officer                                         Commissioner of Patents